United States Patent [19]

Foster

[11] 4,325,535
[45] Apr. 20, 1982

[54] ACTUATOR MECHANISM FOR A ROTARY VALVE OR THE LIKE

[75] Inventor: Stephen R. Foster, New Orleans, La.

[73] Assignee: Baker CAC, Inc., Belle Chasse, La.

[21] Appl. No.: 134,391

[22] Filed: Mar. 26, 1980

[51] Int. Cl.³ .......................................... F16K 31/126
[52] U.S. Cl. ...................................... 251/58; 92/13.2; 92/33; 92/5 R; 251/60
[58] Field of Search ................... 92/31, 33, 5 R, 13.2, 92/32, 116; 251/58, 60, 61, 61.2

[56] References Cited

U.S. PATENT DOCUMENTS

| | | | |
|---|---|---|---|
| 2,225,790 | 12/1940 | Nardone | 92/33 |
| 2,883,144 | 4/1959 | Kendig | 92/33 |
| 3,028,878 | 4/1962 | Natho | 92/5 R |
| 3,162,098 | 12/1964 | Lindberg | 92/33 |
| 3,298,659 | 1/1967 | Cupedo | 251/58 |
| 3,391,722 | 7/1968 | Ligh | 92/31 |
| 3,786,728 | 1/1974 | Sheesley | 92/33 |
| 3,911,793 | 10/1975 | Izumi | 92/33 |
| 3,989,223 | 11/1976 | Burkhardt | 92/33 |
| 4,061,080 | 12/1977 | Sundström | 92/13.2 |
| 4,114,470 | 9/1978 | Sharpe | 74/89.15 |
| 4,196,654 | 4/1980 | Stearns | 92/33 |

FOREIGN PATENT DOCUMENTS

| | | | |
|---|---|---|---|
| 1121475 | 1/1962 | Fed. Rep. of Germany | 92/33 |
| 1426525 | 5/1969 | Fed. Rep. of Germany | 92/33 |

Primary Examiner—Abraham Hershkovltz
Attorney, Agent, or Firm—William C. Norvell, Jr.

[57] ABSTRACT

An actuator for a rotary valve preferably embodying a diaphragm motor operated by pressure fluid. A driving sleeve is reciprocated linearly by the diaphragm motor and within said sleeve is a rotatable shaft, which is axially aligned with the diaphragm motor and driven by a ball screw. A driven sleeve is fixed to said shaft and receives the stem of the valve. All parts are in linear alignment. Means are provided for limiting the extent of the linear movement of the parts.

1 Claim, 1 Drawing Figure

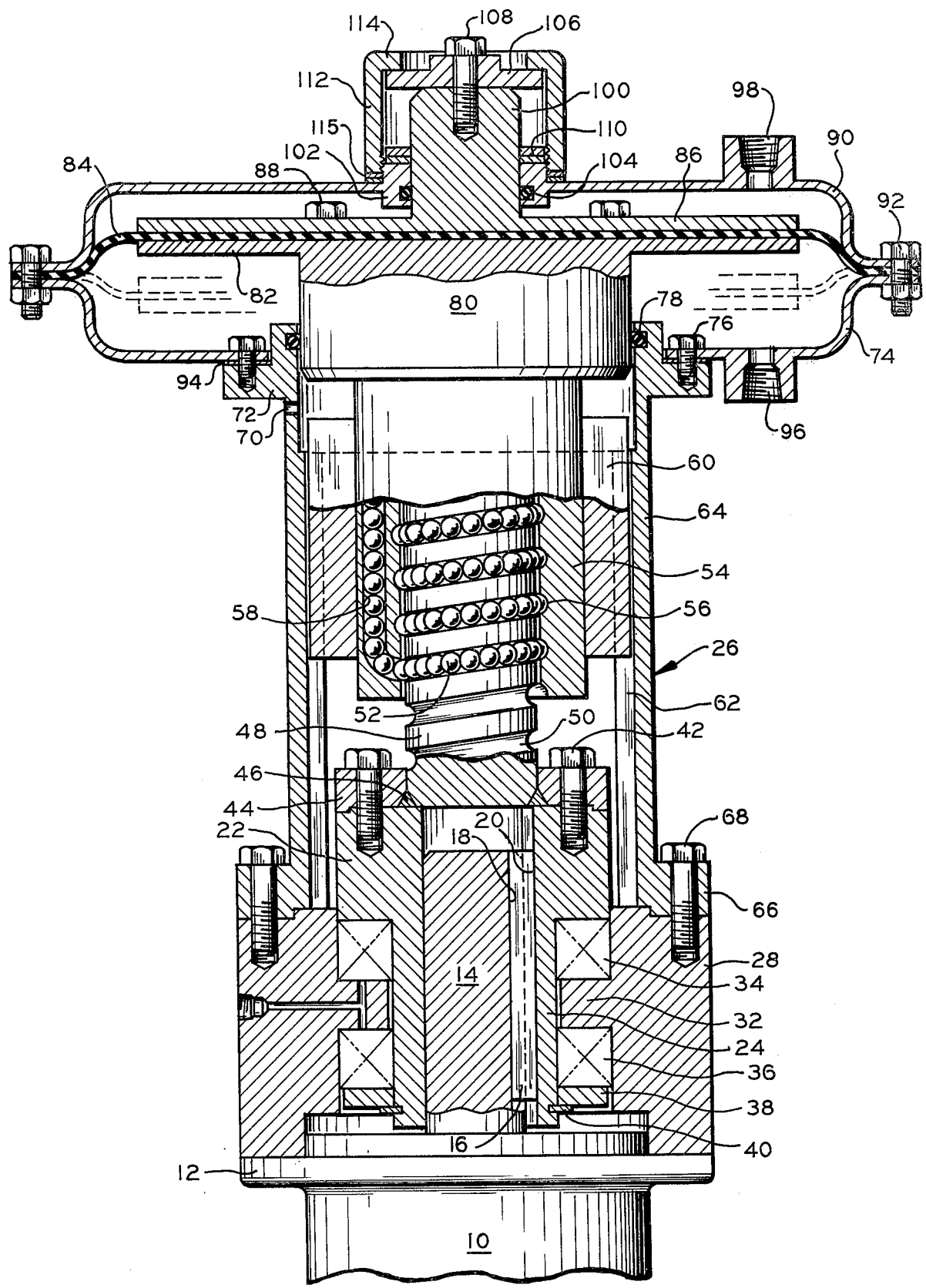

ACTUATOR MECHANISM FOR A ROTARY VALVE OR THE LIKE

BACKGROUND OF THE INVENTION

1. Field of the Invention:

The invention relates to an actuator for a rotary valve, or similar mechanism.

2. Description of the Prior Art:

Actuators for rotary valves usually use a crank arm mechanism, scotch yoke, chain drive, rack and pinion, or vane type operator in order to rotate the valve through 90°, 180° or any desired degree of turning. Although these devices achieve the desired results, they generally are large, in some cases overhang the valve flanges, and in general have a high side thrust component. It is desirable to produce an actuator for a rotary valve or the like, which is compact, simple in construction and operation, efficient and trouble-free.

It is acknowledged that ball screw mechanisms are old in the art, and reference is made to the following U.S. patents as being of interest in this connection, all of which have a rotary input to generate a linear output:

| 476,304 | June 7, 1892 | Gratt |
| 611,832 | Oct. 4, 1898 | Coughlan |
| 3,758,938 | Sept. 18, 1973 | Simmons, et al |
| 4,149,430 | April 17, 1979 | Geppert |

U.S. Pat. No. 4,114,470, entitled "Relating To Pressure Fluid Operated Actuators", issued Sept. 19, 1978, discloses a rotary actuator incorporating an enclosure with a rectilineal slideway along which a slide member is movable which has means at one end of the slide member for moving the member along the slideway and means at the other end of the slide member for restraining the slide member from rotary movement. The slide member carries a screw threaded nut assembly which engages a worm screw forming a part of an output shaft which is rotated when the slide member slides. In such an apparatus, conventional pre-loaded acme threads are utilized in a linearly driven, rotatably reciprocable apparatus in which no means are provided for stroke regulation.

SUMMARY OF THE INVENTION

A rotary valve actuator has a linear input element vertically aligned with the center line of the valve stem, and utilizes a ball screw for back driving the nut portion of the screw linearly and causing the screw portion to rotate. The degree of rotation can be readily effected by simple adjustment means.

Instead of employing a rotary type input to effect linear valve movement, a linear type input is utilized to effect a rotary output. Linear input can be provided for example, by a pressure fluid operated diaphragm and, depending upon the direction of diaphragm movement, rotary output is achieved in one direction or the other. Means other than diaphragms can be employed to effect the desired linear input force, but it is notable that the linear input device is axially aligned with the output mechanism.

BRIEF DESCRIPTION OF THE DRAWINGS

The single FIGURE is a vertical sectional view of a rotary actuator mechanism embodying a ball screw for converting linear force to rotary force, with portions being shown in elevation and partially broken away to more clearly illustrate the invention.

DESCRIPTION OF THE PREFERRED EMBODIMENTS

The illustrated embodiments of the invention comprise a valve part 10 which is rotatively driven between open and closed positions. The particular construction of the valve forms no part of the invention such that detailed description and illustration are not deemed necessary. The part to be rotated can be a device other than a valve. Near its upper end, the valve part 10 has an inner face flange 12 which is integral with the valve part 10. Extending axially from the upper end of the part 10 is a driven stem 14 which is operatively connected by a key 16 engaging respectively in a keyway 18 in the stem and a keyway 20 in a driven sleeve 22. The sleeve 22 has an elongate reduced extension 24 and is contained in a stationary housing 26, at the lower end of which is a cylindrical body 28 forming part of the housing. The face flange 12 of the rotary valve 10 bears against the lower end of the cylindrical housing part 28, and is attached thereto by conventional means, such as bolts (not shown).

Approximately midway of the inside wall of the housing 28 is an inwardly extending internal annular flange or collar 32 provided with flat top and bottom surfaces against which thrust bearings 34 and 36 bear, respectively. The upper side of the bearing 34 is engaged by the under side of the driven sleeve 22. On the lower side of the thrust bearing 36 is a washer or disc 38, which is held in place by a snap ring 40 in the driven sleeve extension 24. Manifestly, when the driven sleeve 22 produces a downward thrust, it is imparted to the thrust bearing 34 and when an upward thrust is created, it is imparted by the disc 38 to the thrust bearing 36.

Secured to the upper end of the driven sleeve 22 by bolts 42 is a plate 44. The plate 44 is secured by a weld 46 to an elongate ball screw shaft 48 disposed in axial alignment with the driven stem 14 of the rotary valve. In the ball screw shaft 48 is a helical groove or track 50, which is generally U-shaped in cross-section. Mounted on the ball screw shaft 48 is an elongate cylindrical driving sleeve or nut 54 having a similar helical groove 56 formed on the interior wall thereof. Loosely retained in the tracks or grooves 50 and 56 is an endless series of steel balls 52.

The assembly is similar to a nut and bolt threaded together, the difference being in the use of balls in the threaded portions. The actual nut and bolt are interlocked by ball bearings. The nut portion, i.e., the driving sleeve 54, has an internal track 58 for recirculating the balls 52. In the drawing, the track 58 is not shown completely, but the opposite end, which is not shown, communicates with the upper end of the cooperating helical grooves 50 and 56 so that there is a continuous row of balls in the helical grooves and the internal connecting track 58. The balls 52 are actually trapped within the driving sleeve 54 and are only allowed to make one, two or three complete revolutions of the lead of the thread and there they continue around the track 58 and are placed back upstream again to the starting position. Reference is made to the U.S. Pat. No. 476,304, issued June 7, 1892, to Gratt, for a detailed description of a ball bearing nut.

Rigid with the cylindrical driving sleeve 54 and projecting from opposite sides are keys 60 which ride in keyway 62 in the interior wall of an elongate cylindrical part 64 of the main housing 26. The lower end of the cylindrical part 64 has an outward flange 66, which is secured to the housing body 28 by bolts 68. The housing 26 is completely sealed except for a small breather hole 70 to prevent contamination from entering the housing 26.

An outwardly extending flange 72 on the upper end of the part 64 is secured to a lower diaphragm housing section 74 by threaded sealed fasteners 76. A gasket 94 provides a fluid seal between the flange 72 and the lower housing section 74. A fluid seal 78 is provided in the flanged end 72 for prevention of fluid leakage along a cylindrical head 80, which is attached to the upper end of the driving sleeve 54 by means of threaded fasteners (not shown). Forming the upper end of the driving sleeve head 80 and attached by threaded fasteners 88 is a circular plate 82 on which is disposed an elastomeric diaphragm 84. The diaphragm 84 is clamped in place by an upper clamping plate 86 whose edges are flush with the edges of the plate 82. The diaphragm 84 extends beyond the plates 82 and 86 and has its outer edge portion clamped between the outwardly flanged edge portions of the lower housing section 74 and an upper housing section 90 by a series of threaded fasteners 92. Threaded fasteners 88 are adapted to extend through the plates 82 and 86 and the diaphragm 84 to securely connect these parts together and to the upper end of the driving head 80.

Gasket means (not shown) may be used to seal the lower plate 82 and the upper end of the driving head 80.

For actuating the diaphragm 84 and associated parts, pressure fluid is delivered from any suitable source through an inlet 96 in the lower housing section 74 and through an inlet 98 in the upper housing section 90. When pressure fluid is introduced into one chamber, the other chamber is open for exhaust purposes.

Rising from the central portion of the upper clamping plate 86 is a cylindrical stem 100, which reciprocates vertically in a bearing boss 102 on the upper housing section 90, a fluid seal 104 in the bearing boss preventing the escape of pressure fluid from the upper diaphragm chamber. On the upper end of the stem 100 is a stroke limiting disk 106, which is somewhat wider than the stem and is secured in place by a bolt 108. Bolt 108 also provides a visual indication when the diaphragm cylindrical head 80 is in its uppermost position. Downward movement of the stem 100 and associated parts is limited by engagement by the disk 106 with spacer washers 110, which are slipped over the stem and rest against the bearing boss 102. The washers 110 can be increased or reduced in number for predetermining the length of the downward movement of the driving sleeve 54. Upward movement of the driving sleeve 54 is limited by engagement of the disk 106 with an inwardly flanged lip 114 on a collar 112, whose lower end is internally threaded for engagement with external threads on the bearing boss 102. This affords some vertical adjustment of the collar 112 for accordingly regulating the upward movement of the stem 100 and connected parts. Washers 115 may be added or subtracted, accordingly, to fix the upward movement of the driving sleeve 54.

Upon introduction of pressure fluid to the upper diaphragm chamber through the inlet 98, the driving sleeve 54 is forced to move rectilinealy downwardly, the keys 60 operating to prevent rotary movement. During this movement, fluid is exhausted from the lower diaphragm chamber through the opening 96. By means of the ball screw shaft 48 involving the series of balls 52, helical tracks 50 and 56 and the ball passage 58, the ball screw shaft 48 is caused to rotate. This rotation is transmitted to the driven sleeve 22 and its sleeve extension 24. Through the key 16, the stem 14 of the rotary valve 10 is driven. All of this takes place in an axially aligned relation, thereby affording efficiency in operative actuation, compactness and conservation of space. It is not considered necessary to describe the reverse operation in which pressure fluid is introduced through the opening 96 and exhausted through the opening 98, because the same will be readily understood by those skilled in the art.

The length of the stroke of the driving sleeve 54 can be adjusted by reducing or adding to the number of spacer washers 110, as well as by rotating the collar 112 for screw thread adjustment and adding or subtracting washer 115, as described above. The stroke adjusting screw 94 alternatively can be regulated for stroke adjustment.

It will be appreciated from the above description that an actuator mechanism has been developed wherein a linearly moving input force can be readily converted to a rotary moving output force while maintaining all action along the centerline of the valve stem itself. In instances where space limitations are of a major consideration, it has been found advantageous to employ a relatively shallow lead angle for the grooves or tracks 50 and the associated grooves or tracks 56. However, it must be understood that in such circumstances, it may be necessary to increase the linear input force to achieve the required output torque to actuate an associated valve, for example.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. An actuator mechanism for a rotary valve comprising: means providing a diaphragm receiving chamber; a reciprocable diaphragm within said chamber; pressure fluid intake means on each side of said diaphragm for actuating said diaphragm in one direction or the other; means for limiting the reciprocal movement of said diaphragm comprising independent externally adjustable means on one side of said diaphragm to limit its movement in each direction; an elongate driving member having a head secured to said diaphragm for reciprocal movement therewith; a housing secured at one end to said chamber means; key means between said driving member and said housing for restricting movement of said driving member to linear reciprocal movement; a driven ball screw shaft rotatable within said reciprocal driving member; a continuous ball nut screw between said shaft and driving member and including opposing helical grooves in the shaft and driving member and a ball passage in said driving member connecting opposite ends of said grooves; a rotatable sleeve rigidly secured to the end of said driven ball screw shaft and adapted to receive the stem of the rotary valve to impart rotary movement thereto; and thrust bearings between said rotatable sleeve and said housing for receiving the thrust in opposite directions whereby reciprocal movement of said diaphragm in either direction will effect rotary movement of said valve within predetermined limits according to the adjustment of said reciprocal movement limiting means of said diaphragm.

* * * * *